(12) United States Patent
Otterbein

(10) Patent No.: US 11,485,620 B2
(45) Date of Patent: Nov. 1, 2022

(54) OPERATING METHOD FOR AN OPERATOR-CONTROLLED INDUSTRIAL TRUCK, AND INDUSTRIAL TRUCK

(71) Applicant: HUBTEX MASCHINENBAU GMBH & CO. KG, Fulda (DE)

(72) Inventor: Michael Otterbein, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 334 days.

(21) Appl. No.: 16/955,056

(22) PCT Filed: Dec. 5, 2018

(86) PCT No.: PCT/EP2018/083627
§ 371 (c)(1),
(2) Date: Jun. 18, 2020

(87) PCT Pub. No.: WO2019/121014
PCT Pub. Date: Jun. 27, 2019

(65) Prior Publication Data
US 2020/0377353 A1 Dec. 3, 2020

(30) Foreign Application Priority Data
Dec. 22, 2017 (DE) .................... 10 2017 131 133.5

(51) Int. Cl.
*F16H 61/456* (2010.01)
*B66F 9/22* (2006.01)
(Continued)

(52) U.S. Cl.
CPC ............ *B66F 9/22* (2013.01); *B66F 9/07568* (2013.01); *F16H 59/58* (2013.01);
(Continued)

(58) Field of Classification Search
CPC .......... F16H 59/18; F16H 59/58; F16H 61/456
See application file for complete search history.

(56) References Cited

U.S. PATENT DOCUMENTS 3,977,424 A   8/1976  Patton
4,108,265 A * 8/1978  Abels .................... F16H 61/456
                                                    60/491
(Continued)

FOREIGN PATENT DOCUMENTS

EP    1 452 381 A1    9/2004
GB    1 467 759 A     3/1977
JP    H11-208299 A    8/1999

*Primary Examiner* — Edwin A Young
(74) *Attorney, Agent, or Firm* — Norman B. Thot

(57) ABSTRACT

An operating method for an industrial truck. The industrial truck includes a hydraulic pump which provides a hydraulic output, an output setpoint value generator which controls the hydraulic output to influence a traveling speed, two drive wheels which respectively comprise a hydraulic drive unit driven via the hydraulic pump, and a hydraulic device. The hydraulic device is switchable between a first switching state, where the hydraulic drive units are supplied with hydraulic outputs which are different, and a second switching state, where the hydraulic drive units are supplied with hydraulic outputs that have a particular ratio with respect to each other. The operating method includes detecting at least one operating parameter of the output setpoint value generator, comparing the at least one operating parameter with a predefined threshold value, and moving the hydraulic device from the first switching state to the second switching state based on the comparison.

12 Claims, 1 Drawing Sheet

(51) Int. Cl.
  *B66F 9/075* (2006.01)
  *F16H 59/58* (2006.01)
  *B66F 17/00* (2006.01)
  *F16H 59/18* (2006.01)
  *F16H 61/40* (2010.01)

(52) U.S. Cl.
  CPC ......... *B60Y 2200/15* (2013.01); *B66F 17/003* (2013.01); *F16H 59/18* (2013.01); *F16H 61/40* (2013.01); *F16H 61/456* (2013.01)

(56) References Cited

U.S. PATENT DOCUMENTS

| | | | |
|---|---|---|---|
| 4,157,125 A | 6/1979 | Bushell et al. | |
| 2003/0010026 A1* | 1/2003 | Evans | F16H 39/14 |
| | | | 60/443 |
| 2003/0070859 A1* | 4/2003 | Dahl | F16H 61/42 |
| | | | 180/305 |
| 2004/0074686 A1* | 4/2004 | Abend | F16H 61/444 |
| | | | 180/242 |
| 2013/0030656 A1* | 1/2013 | Keller | B62D 7/1509 |
| | | | 701/42 |
| 2015/0232312 A1* | 8/2015 | Kaneko | F16H 61/468 |
| | | | 701/50 |

* cited by examiner

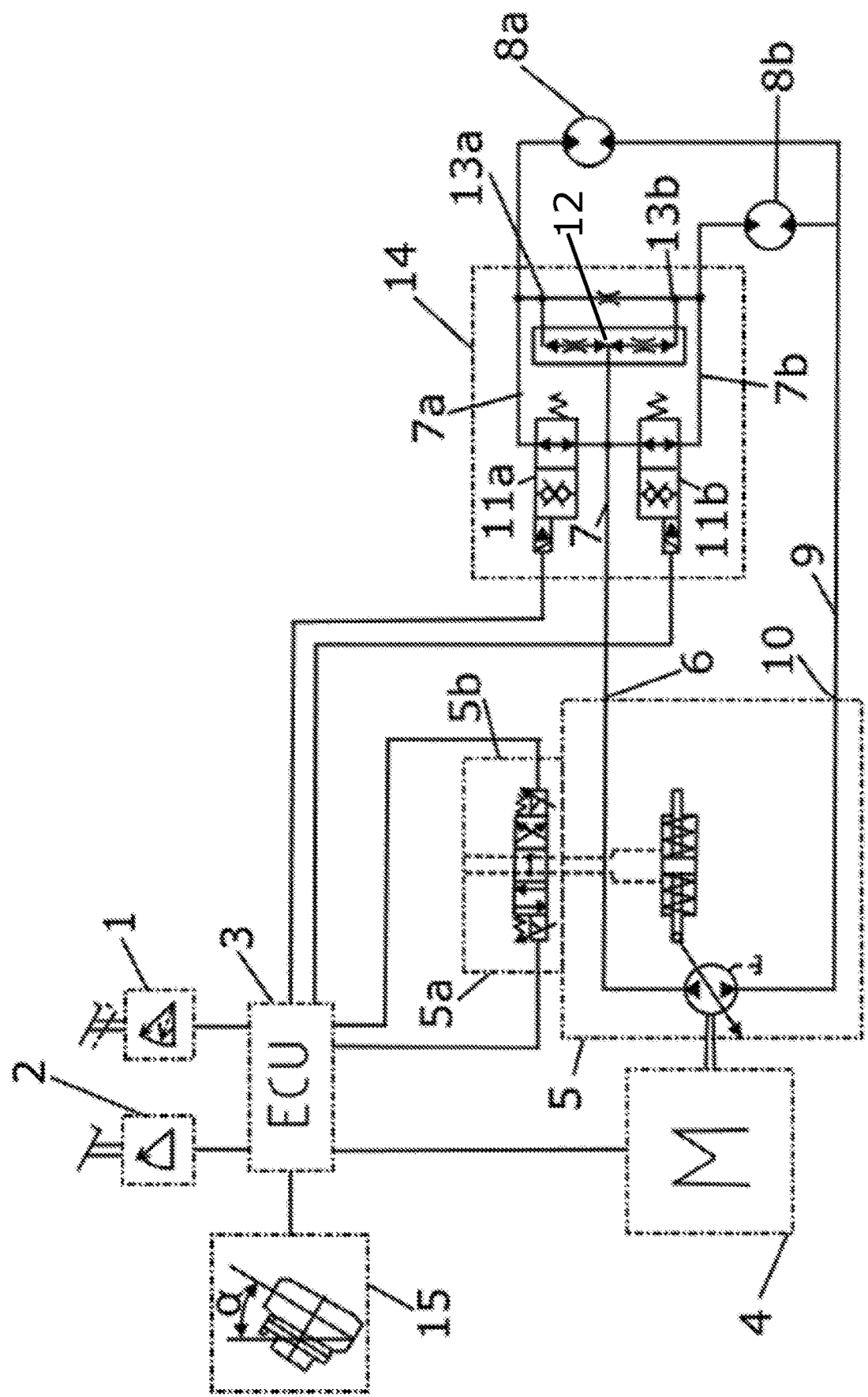

OPERATING METHOD FOR AN OPERATOR-CONTROLLED INDUSTRIAL TRUCK, AND INDUSTRIAL TRUCK

CROSS REFERENCE TO PRIOR APPLICATIONS

This application is a U.S. National Phase application under 35 U.S.C. § 371 of International Application No. PCT/EP2018/083627, filed on Dec. 5, 2018 and which claims benefit to German Patent Application No. 10 2017 131 133.5, filed on Dec. 22, 2017. The International Application was published in German on Jun. 27, 2019 as WO 2019/121014 A1 under PCT Article 21(2).

FIELD

The present invention relates to an operating method for an operator-controlled industrial truck comprising a hydraulic pump, the output of which can be controlled by an operator-actuable output setpoint value generator for influencing the traveling speed in order to provide hydraulic output, comprising at least two drive wheels each of which comprise a hydraulic drive unit that can be driven by the hydraulic pump, and comprising a hydraulic device that can be switched between a first switching state, in which drive units can be supplied with different hydraulic outputs depending on the driving situation, and a second switching state, in which the drive units are supplied, under positive guidance, with hydraulic outputs that are in a particular ratio in relation to one another.

The present invention further relates to an industrial truck comprising a hydraulic pump, the output of which can be controlled by an operator-actuable output setpoint value generator for influencing the traveling speed in order to provide hydraulic output, comprising at least two drive wheels each of which comprise a hydraulic drive unit that can be driven by the hydraulic pump, and comprising a hydraulic device that can be switched, for example, electrically, between a first switching state, in which drive units can be supplied with different hydraulic outputs depending on the driving situation, and a second switching state, in which the drive units are supplied, under positive guidance, with outputs that are in a particular ratio in relation to one another.

BACKGROUND

The industrial trucks may in particular be vehicles that are provided for transporting loads and/or handling loads. Examples include lift trucks such as forklifts.

Such vehicles are usually operator controlled. In many cases, this involves a driver on an operating platform provided on the vehicle from which it is usually possible to perform driving functions, such as steering, accelerating and braking, and other functions of the vehicle, such as lifting and lowering a load, etc.

The industrial trucks to which the present invention relates are those that comprise at least two drive wheels, each of which comprise a hydraulic drive unit that can be driven by a motor-driven hydraulic pump. To be able to vary the traveling speed, these industrial trucks have at least one operator-actuable output setpoint value generator that is often designed as an accelerator pedal that can be operated by one of the driver's feet.

Such industrial trucks usually need to be operated for use in warehouses that are in part equipped with shelving rows arranged closely adjacent to one another. For this purpose, the industrial trucks must be particularly easy to maneuver so that time-consuming maneuvering operations can be avoided to the greatest extent possible. To allow these industrial trucks to be steered when making turns that have very small radii, it must be possible to supply the drive units with different hydraulic outputs depending on the driving situation. These vehicles usually have a so-called "hydraulic differential" therefor. In the simplest case, the hydraulic differential is formed by supplying the hydraulic flow supplied by the hydraulic pump to the at least two drive units via a flow divider. A larger hydraulic flow then automatically flows through the drive unit that provides the lowest hydraulic resistance, i.e., the one where the corresponding drive wheel rotates faster or can be rotated more easily.

Industrial trucks equipped with such a hydraulic differential are capable of driving through tight curves, even without grinding one or more wheels. It has been found, however, that such vehicles, in particular when driving with only a small load or with no load, may be associated with driving situations where dynamic mass effects change the wheel loads so that it may cause the drive wheels to slip.

It is already known to provide so-called hydraulic differential locks to improve the driving characteristics of such industrial trucks. These industrial trucks may have a hydraulic device that can be switched over therefor, via which the drive units are forced to operate with hydraulic outputs in a predefined ratio, usually in a ratio of 1, i.e., with the same hydraulic output. It is thereby possible to increase traction in a driving situation in which the driver suspects that at least one of the drive wheels could slip.

SUMMARY

An aspect of the present invention is to improve the handling of such industrial trucks and to facilitate their safe operation by a driver.

In an embodiment, the present invention provides an operating method for an industrial truck which is operator controlled. The industrial truck includes a hydraulic pump configured to provide a hydraulic output, an output setpoint value generator which is configured to be operator actuable and to control the hydraulic output of the hydraulic pump so as to influence a traveling speed, at least two drive wheels each of which comprise a hydraulic drive unit, and a hydraulic device. The hydraulic drive units are driven via the hydraulic pump. The hydraulic device is configured to be switchable between a first switching state, in which the hydraulic drive units are suppliable with a respective hydraulic output which is different depending on a driving situation, and a second switching state, in which the hydraulic drive units are supplied, under a positive guidance, with a respective hydraulic output that have a particular ratio with respect to each other. The operating method includes detecting at least one operating parameter of the output setpoint value generator, comparing the at least one operating parameter with a predefined threshold value, and moving the hydraulic device from the first switching state to the second switching state based on the comparison.

BRIEF DESCRIPTION OF THE DRAWING

The present invention is described in greater detail below on the basis of embodiments and of the drawing in which:

The FIGURE shows a schematic hydraulic diagram of an embodiment of the present invention.

DETAILED DESCRIPTION

The present invention provides an operating method in which at least one operating parameter is detected when the output setpoint value generator, for example, the accelerator pedal, is operated. The operating parameters in particular include the absolute value of the driving output predefined by the output setpoint value generator, which is, in the case of an accelerator pedal, for example, the accelerator pedal position, as well as the change in the output setpoint value predefined by the output setpoint value generator as a function of time, which is, in the case of an accelerator pedal, for example, the speed at which it is operated by the driver. The at least one operating parameter is compared with a predefined threshold value for the operating parameter and, in accordance with the result of the comparison, the hydraulic device is automatically moved from the first switching state into the second switching state. Other operating parameters that influence the outputs delivered by the drive devices can be detected and evaluated accordingly. A plurality of operating parameters can also be detected and evaluated.

The hydraulic differential lock is accordingly automatically activated, for example, if the accelerator pedal is operated beyond a particular value, for example, pressed down, and/or the accelerator pedal is operated at a speed above a particular value, for example, pressed down, regardless of the length of the operation path, for example, the depression.

Practice has shown that this operating method makes it easier for the driver to drive the industrial truck safely and equally quickly.

In an embodiment of the operating method of the present invention, the hydraulic circuit can, for example, effect the second switching state for a predefined duration, for example, within a range of 1 to 15 seconds, after the at least one operating parameter has reached the predefined threshold value. If, for example, the accelerator pedal is pressed down beyond a corresponding, predefined threshold value and held in this position over a prolonged period, as may be the case, for example, when traveling straight over a long distance, the hydraulic circuit is, based on this embodiment of the operating method of the present invention, moved back into the first switching state, i.e., the differential lock is released, after the predefined period elapses. This prevents the grinding of one or more drive wheels when entering a curve from straight-ahead travel given an unchanged output setpoint value, for example, an unchanged accelerator pedal position.

In an embodiment of the operating method of the present invention, the hydraulic device can, for example, be moved from the first switching state into the second switching state independently of the at least one detected operating parameter. The hydraulic differential lock can thus be activated independently of the operation of the output setpoint value generator, for example, if the driver can foresee that driving with the hydraulic differential lock activated will be advantageous for an impending driving situation, regardless of the drive output. Examples of such a driving situation include driving on a ramp, driving across a smooth surface, or slowly accelerating the industrial truck out of a tight curve.

In embodiment of the industrial truck of the present invention, the steering angle of at least one wheel that can be steered about a steering axis is, for example, detected from the neutral position, and the traveling speed is automatically influenced as a function of the steering angle, for example, inversely proportionally to the steering angle. This in particular increases the driving safety of an industrial truck operated using the operating method according to the present invention. However, because the driving safety of an industrial truck that does not comprise the previously described function of automatically switching on the hydraulic differential lock can be substantially increased, an operating method in which the traveling speed is automatically influenced as a function of the steering angle already has its own inventive significance.

In the case of the industrial truck according to the present invention, the electronic control device is designed so that:
  the output of the motor drive of the hydraulic pump and/or the hydraulic output delivered by the hydraulic pump is delivered as a function of the operation of the output;
  at least one operating parameter of the output setpoint value generator is detected and compared with a setpoint value for the operating parameter; and
  the hydraulic device is switched over into the second switching state in accordance with the result of this comparison, for example, for a predefined, limited duration, for example, for approximately 1 to 15 seconds, in which second switching state the drive units are force-supplied with outputs that are in a particular ratio in relation to one another, in particular in a ratio of approximately 1, i.e., all have approximately the same output.

In an embodiment of the industrial truck according to the present invention, an operation device can, for example, be connected to the electronic control device, and the electronic control device can, for example, be designed so that operating the operation device effects the second switching state of the hydraulic device, i.e., the activation of the hydraulic differential lock. As already explained above, this makes it possible for the driver to operate the industrial truck of the present invention even with an activated hydraulic differential lock if the driver deems this advantageous for the driving situation but the hydraulic differential lock is not activated due to the current operating parameters.

In an embodiment of the present invention, the vehicle according to the present invention can, for example, comprise at least one wheel that can be steered about a steering axis by a steering angle and a device for detecting the steering angle that is connected to the electronic control device, wherein the electronic control device is designed so that the drive output of the hydraulic pump and/or the hydraulic output delivered by the hydraulic pump is automatically influenced as a function of the steering angle, in particular inversely proportionally to the steering angle from a neutral position.

This embodiment is of independent inventive importance because it already increases the driving safety of the industrial truck independently of the possibility of activating the differential lock.

An embodiment of the present invention will be described below under reference to the accompanying drawing.

In the shown embodiment, the industrial truck comprises an electrically operating output setpoint value generator 1, for example, in the form of a foot pedal, that is, in addition to an operation device 2, connected to an electronic control device 3.

A drive motor 4 of a hydraulic pump 5 is also connected to the electronic control device 3. The hydraulic pump 5 is designed as an electrically controllable variable displacement pump and comprises two controlling magnets 5a, 5b with which the hydraulic medium front stream generated by the hydraulic pump 5 can be changed. The controlling magnets 5a, 5b are likewise connected to the electronic control device 3.

The drive motor 4 can be a rotary motor of any design that allows the output delivery via the electronic control device 3 to be influenced. An electric motor or internal combustion engine is in particular here possible.

The hydraulic pump 5 has a first hydraulic connection 6 to which a supply line 7 is connected. Two partial lines 7a, 7b connect the supply line 7 to a respective drive unit 8a, 8b, each of which comprises a hydraulic motor and each of which is operatively connected to a drive wheel (which is not shown in the FIGURE). The two partial lines 7a, 7b open into a return line 9 that is connected to a second hydraulic connection 10 of the hydraulic pump 5.

An electrically actuated 2/2-way valve 11a, 11b is integrated into each of the two partial lines 7a, 7b. Each of the two 2/2-way valves 11a, 11b is equipped with an electric switching unit that is likewise connected to the electronic control device 3.

The input of a flow divider 12 is connected to the supply line 7. The flow divider 12 has two outputs 13a, 13b, each of which is connected to one of the two partial lines 7a, 7b.

In the first switching state shown in the FIGURE, the volumetric flow of hydraulic medium generated using the hydraulic pump 5 can reach the drive units 8a, 8b through the two 2/2-way valves 11a, 11b. Because the two partial lines 7a, 7b are connected to the drive units 8a, 8b in a throttle-free manner and the return line 9 is also similarly connected to the drive units 8a, 8b in a throttle-free manner, the volumetric flow of the hydraulic medium can similarly flow through one or the other of the drive units 8a, 8b. A hydraulic device 14 comprising the 2/2-way valves 11a, 11b is thus in a first switching state in which the two drive units 8a, 8b are supplied with volumetric flows of a hydraulic medium, the ratio of which volumetric flows in relation to one another is automatically adapted to the requirements resulting from the respective driving situation.

To move the hydraulic device 14 into a switching state in which both drive units 8a, 8b can be supplied with the same volumetric flow of hydraulic medium, the two 2/2-way valves 11a, 11b can switch over into an operating state with the aid of the electronic control device 3 by cutting off the two partial lines 7a, 7b in both directions. In this switching state, the hydraulic medium is supplied via the supply line 7 to the flow divider 12, which is part of the hydraulic device 14. Roughly equal amounts of hydraulic medium reach the drive units 8a, 8b under roughly the same pressure via said flow divider 12 so that the drive units 8a, 8b are supplied with roughly the same output and each associated drive wheel is also driven with roughly the same output. The switchover process of the two 2/2-way valves 11a, 11b takes place roughly when the output setpoint value generator 1 has reached a predefined output setpoint value. The output setpoint value can be considered to be reached, for example, if the output setpoint value generator 1 has been moved to the position shown in dashed lines in the FIGURE. Once this threshold value has been reached, the switchover into the second switching state takes place in which the hydraulic device 14 then remains for a predefined duration, for example, for 10 seconds.

Irrespective of whether or not an output setpoint value at least equal to the threshold value is predefined using the output setpoint value generator 1, the switchover process can take place between the first and second switching state by actuating the operation device 2. The hydraulic device 14 then remains in this switching state at least for the duration of the actuation of the operation device 2.

It is finally optionally possible, as shown in the FIGURE, for a device 15 for detecting a steering angle of a steered wheel of the industrial truck to be connected to the electronic control device 3. The device 15 for detecting a steering angle of a steered wheel of the industrial truck causes the output delivered by the hydraulic pump 5 to be reduced as a function of the detected steering angle in the case of a steering angle from a neutral position that, for example, corresponds to a straight-ahead traveling direction for the industrial truck. The output can, for example, be reduced inversely proportionally as a function of the steering angle. In the case of an industrial truck designed in such a manner, the output is thus automatically reduced as a function of the steering angle, as a result of which the driving safety is also increased, even independently of the possibility of a hydraulic differential lock.

The present invention is not limited to embodiments described herein; reference should be had to the appended claims.

LIST OF REFERENCE SIGNS 1 output setpoint value generator
2 operation device
3 electronic control device
4 drive motor
5 hydraulic pump
5a, 5b controlling magnets
6 first hydraulic connection
7 supply line
7a, 7b partial lines
8a, 8b drive units
9 return line
10 second hydraulic connection
11a, 11b 2/2-way valve
12 flow divider
13a, 13b outputs
14 hydraulic device
15 device for detecting the steering angle of a steered wheel of the industrial truck
α steering angle

What is claimed is:

1. An operating method for an industrial truck which is operator controlled, the industrial truck comprising:
   a hydraulic pump configured to provide a hydraulic output;
   an output setpoint value generator which is configured to be operator actuable and to control the hydraulic output of the hydraulic pump so as to influence a traveling speed;
   at least two drive wheels each of which comprise a hydraulic drive unit, the hydraulic drive units being driven via the hydraulic pump; and
   a hydraulic device which is configured to be switchable between a first switching state, in which the hydraulic drive units are suppliable with a respective hydraulic output which is different depending on a driving situation, and a second switching state, in which the hydraulic drive units are supplied, under a positive guidance, with a respective hydraulic output that have a particular ratio with respect to each other,
   the operating method comprising:
   detecting at least one operating parameter of the output setpoint value generator;

comparing the at least one operating parameter with a predefined threshold value; and moving the hydraulic device from the first switching state to the second switching state based on the comparison.

2. The operating method as recited in claim 1, further comprising:

moving the hydraulic device to the second switching state for a predefined duration.

3. The operating method as recited in claim 1, wherein the at least one operating parameter comprises an absolute value which is predefined by the output setpoint value generator.

4. The operating method as recited in claim 1, wherein the at least one operating parameter comprises a change in an output setpoint value which is predefined by the output setpoint value generator as a function of time.

5. The operating method as recited in claim 1, wherein the hydraulic device is switchable from the first switching state into the second switching state independently of the at least one operating parameter detected.

6. The operating method as recited in claim 1, wherein the particular ratio of the respective hydraulic output which is supplied to the hydraulic drive units is 1.

7. The operating method as recited in claim 1, wherein, at least one wheel of the industrial truck is steerable about a steering axis at a steering angle, and the method further comprises:

detecting the steering angle; and automatically influencing a traveling speed as a function of the steering angle.

8. The operating method as recited in claim 7, wherein the traveling speed is automatically reduced inversely proportionally to an increase of the steering angle with respect to a straight-ahead position.

9. An industrial truck comprising:

a hydraulic pump comprising a drive motor which comprises an output control device, the hydraulic pump being configured to provide a hydraulic output;

an output setpoint value generator which is configured to be operator actuable and to control the hydraulic output of the hydraulic pump so as to influence a traveling speed;

at least two drive wheels each of which comprise a hydraulic drive unit, the hydraulic drive units being driven via the hydraulic pump;

a hydraulic device which is configured to be switchable between a first switching state, in which the hydraulic drive units are suppliable with a respective hydraulic output which is different depending on a driving situation, and a second switching state, in which the hydraulic drive units are supplied, under a positive guidance, with a respective hydraulic output that are in a particular ratio in respect to each other;

an electronic control device which is connected to the hydraulic device and to one or more of the output control device of the drive motor of the hydraulic pump and the hydraulic pump, the electronic control device being configured so that, an output of one or more of the drive motor and of the hydraulic pump are controlled as a function of an operation of the output setpoint value generator, at least one operating parameter of the output setpoint value generator is detected and compared with a setpoint value for the at least one operating parameter, and the hydraulic device is switched from the first switching state into the second switching state based on a result of the comparison.

10. The industrial truck as recited in claim 9, wherein the switching of the hydraulic device from the first switching state into the second switching state based on the result of the comparison occurs for a predefined and limited duration.

11. The industrial truck as recited in claim 9, further comprising:

an operation device which is connected to the electronic control device, wherein, the electronic control device is further configured so that an operation of the operation device effects the second switching state of the hydraulic device.

12. The industrial truck as recited in claim 9, further comprising:

at least one wheel which is steerable about a steering axis at a steering angle; and a device which is configured to detect the steering angle, the device being connected to the electronic control device, wherein, the electronic control device is further configured so that one or more of a drive output of the drive motor of the hydraulic pump and the hydraulic output provided by the hydraulic pump are automatically influenced as a function of the steering angle.

* * * * *